Feb. 3, 1925.      1,525,086
J. B. MURRAY ET AL
RIVETING AND THE LIKE
Filed July 12, 1922
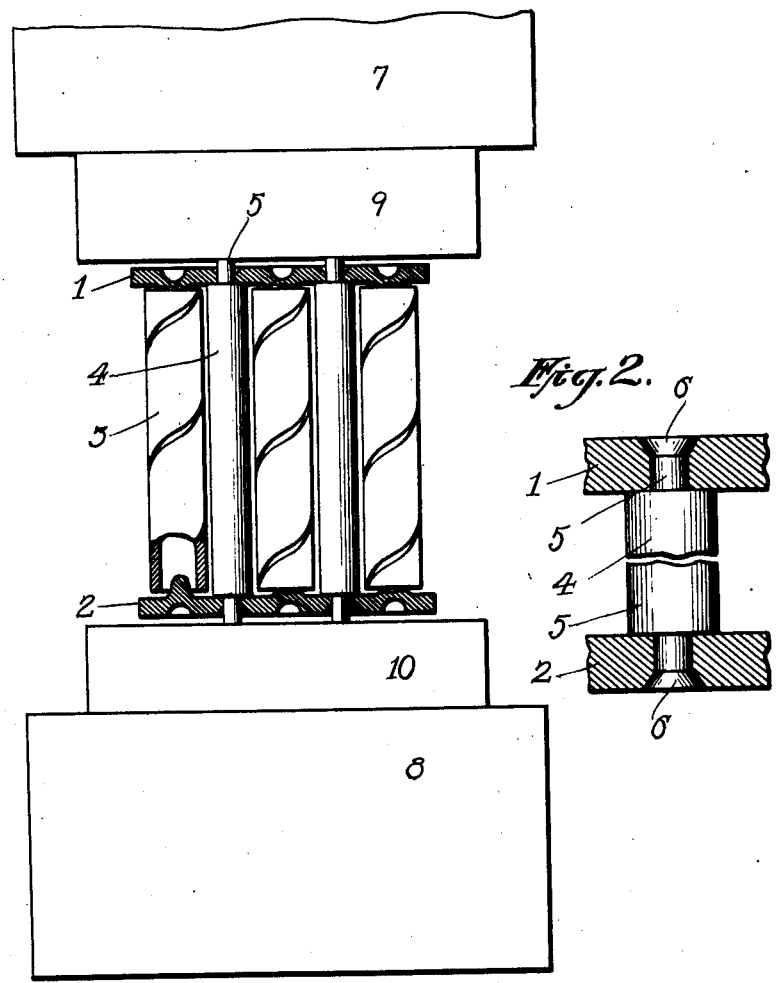
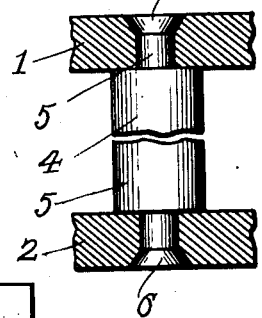
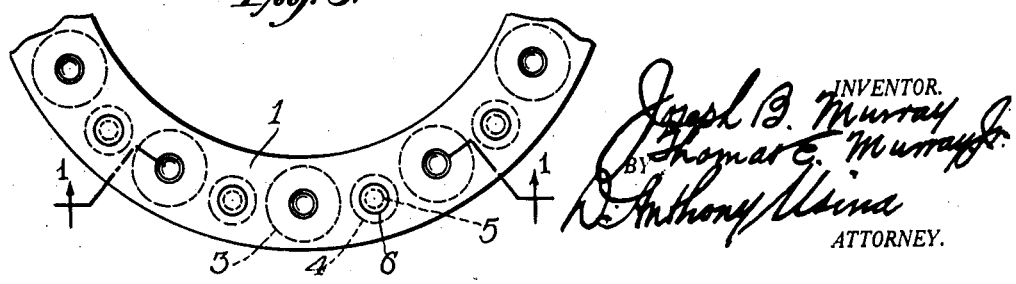

Patented Feb. 3, 1925.

1,525,086

UNITED STATES PATENT OFFICE.

JOSEPH B. MURRAY AND THOMAS E. MURRAY, JR., OF NEW YORK, N. Y.

RIVETING AND THE LIKE.

Application filed July 12, 1922. Serial No. 574,497.

*To all whom it may concern:*

Be it known that we, JOSEPH B. MURRAY and THOMAS E. MURRAY, Jr., citizens of the United States, and residents of the city, county, and State of New York, respectively, have invented certain new and useful Improvements in Riveting and the like, of which the following is a specification.

This invention aims to provide certain improvements in the operations of riveting and similar upsetting operations by which several operations can be performed at once and thus the total work be effected in a comparatively short time.

The accompanying drawings illustrate an embodiment of the invention in which—

Fig. 1 is a section of a part of a roller bearing in the course of riveting the parts together, the section being a development approximately on the line 1—1 of Fig. 3;

Fig. 2 is a detail showing the riveting operation completed;

Fig. 3 is a plan of the finished work.

Referring to the embodiment of the invention illustrated, the bearing consists of upper and lower rings 1 and 2 between which are located rollers 3 trunnioned loosely. At intervals the rings 1 and 2 are spaced apart by rods 4 with shoulders near their ends which determine the spacing of the rings. The rods 4 have extensions 5 at their ends of reduced diameter passing through the rings and upset or riveted against the outer faces of the rings to hold the parts of the bearing assembled. The openings in the rings through which the rivets 5 pass are usually flared on the outside as shown so as to accommodate the upset head 6 of the rivet and leave a substantially flush outer face on the ring as shown for example in Fig. 2.

In order to perform the desired operations rapidly and economically the parts assembled as shown in Fig. 1 are located between a pair of electrodes 7 and 8 of copper or other metal terminals 9 and 10 in direct engagement with the ends of the rivets. An electric current is then passed from one terminal to the other through all the rivets simultaneously to heat and soften them. One of the electrodes is then moved toward the other, (or they may both be moved) to upset the ends of the several rivets simultaneously.

Preferably we employ the Murray method of applying the current, using a current of extremely high amperage or density per square inch of cross-section of the work, say for example 90,000 or more amperes per square inch; and continuing it for a very brief interval of time, such for example as a fraction of a second. In the application of current to a number of work pieces simultaneously it is always a matter of some difficulty to secure a uniform distribution of the current and to ensure that all the riveting operations will be equally well done. The quick welding Murray method reduces this difficulty of faulty distribution to a minimum, the high density of the current serving to heat all the rivets very quickly to the desired extent.

Where the rivets are put in one after the other, the operations on one rivet sometimes loosen one or more of the rivets previously fastened, either by the jarring or distortion of the parts through mechanical pressure or by the distortion of them in the application of the heat necessary to soften the rivet which is being headed.

By continuing the current after the upsetting of the ends of the rivets, the heads of the latter may be welded or partially welded to the rings so as to ensure more rigid fastening.

The same method of multiple operations may be applied to the riveting of various other articles than the ball bearing referred to, though it is particularly important in this connection because the two rings to be riveted together are so far apart and the strains in use tending to loosen them are considerable. Therefore, in the case where all the rivets are in one piece of work as in the roller-bearing illustrated it is important to fasten all the rivets equally well and this can be done only by heating them simultaneously. The operation may be applied to various other riveted work, and to various other heating or upsetting operations which, though not riveting operations in an exact sense, are substantially so.

Though we have described with great particularity of detail certain embodiments of our invention, yet it is not to be understood therefrom that the invention is restricted to the particular embodiments disclosed. Various modifications thereof may be made by those skilled in the art without departure from the invention as defined in the following claims.

What we claim is:

1. The method of fastening parts together which consists in placing a plurality of rivets and passing an electric current through said rivets and upsetting the ends thereof simultaneously.

2. The method of fastening parts together which consists in placing a plurality of rivets and passing through said rivets a current of extremely high amperage, approximately 90,000 or more amperes per square inch, for a brief interval of time, approximately a second or less, and upsetting the said rivets simultaneously.

3. The method of fastening parts together which consists in setting in place a plurality of rivets and passing an electric current through said rivets simultaneously and between a single pair of contacts, and upsetting said rivets simultaneously.

4. The method of fastening parts together which consists in setting in place a plurality of rivets, locating said rivets between a single pair of electrodes and passing an electric current through said rivets simultaneously and moving one of said electrodes toward the other to upset said rivets simultaneously.

5. The method of fastening together the parts of a single piece of work which consists in assembling the parts with a plurality of rivets in place and passing an electric current through said rivets and upsetting them all simultaneously.

6. The method of fastening together the parts of an anti-friction bearing which consists in assembling the parts with a plurality of rivets in place and passing an electric current through said rivets and upsetting them all simultaneously.

7. The method of fastening together the parts of a single piece of work in spaced relation to each other which consists in assembling the parts with shouldered spacers between them to limit their approach to each other and with rivets extending through them and passing an electric current through said rivets and upsetting them all simultaneously.

In witness whereof we have hereunto signed our names.

JOSEPH B. MURRAY.
THOMAS E. MURRAY, Jr.